United States Patent [19]

Dolph et al.

[11] Patent Number: 4,882,586

[45] Date of Patent: Nov. 21, 1989

[54] ANALOG-TO-DIGITAL CONVERTER

[75] Inventors: Darrel A. Dolph, Big Rapids; Leonard W. Demski, Reed City; Robert E. Taylor, Cadillac; Jean-Marie Loisel, Big Rapids, all of Mich.

[73] Assignee: Nartron Corporation, Reed City, Mich.

[21] Appl. No.: 922,519

[22] Filed: Oct. 24, 1986

Related U.S. Application Data

[62] Division of Ser. No. 620,188, Jun. 13, 1984, Pat. No. 4,621,327.

[51] Int. Cl.$^4$ .............................................. H03M 1/56
[52] U.S. Cl. ..................................... 341/169; 341/124
[58] Field of Search ................ 340/347 AD, 347 NT; 341/124, 166, 169

[56]  References Cited

U.S. PATENT DOCUMENTS

| | | | |
|---|---|---|---|
| 3,735,367 | 5/1973 | Bennett Jr. ................. | 340/347 NT |
| 4,465,370 | 8/1984 | Yuasa et al. ............... | 340/347 NTX |
| 4,613,950 | 9/1986 | Knierim et al. ............. | 340/347 NT |

OTHER PUBLICATIONS

Electronic Analog/Digital Conversions, Van Nostrand Reinhold Company, 1970, pp. 275-276.

*Primary Examiner*—William M. Shoop, Jr.
*Assistant Examiner*—Marc S. Hoff
*Attorney, Agent, or Firm*—Watts, Hoffmann, Fisher & Heinke

[57] ABSTRACT

A power steering control unit for use with an electric motor assisted vehicle power steering system. The control unit includes two microprocessor controllers that monitor vehicle speed and a torque applied through a vehicle steering column in calculating a duty cycle for the assist motor. The response to the speeed and torque inputs can be adjusted by setting a group of four control switches on the vehicle dashboard. Each microprocessor not only calculates an optimum motor energization but also monitors motor performance. In the event this performance deviates from an expected range the assist is removed and in some cases corrective steps taken to correct the unit's performance. An electrically erasable read only memory coupled to the microprocessors stores constants needed in calculating an energization sequence. The EEROM also stores indicators of the control unit performance to aid in diagnosing difficulties.

12 Claims, 8 Drawing Sheets

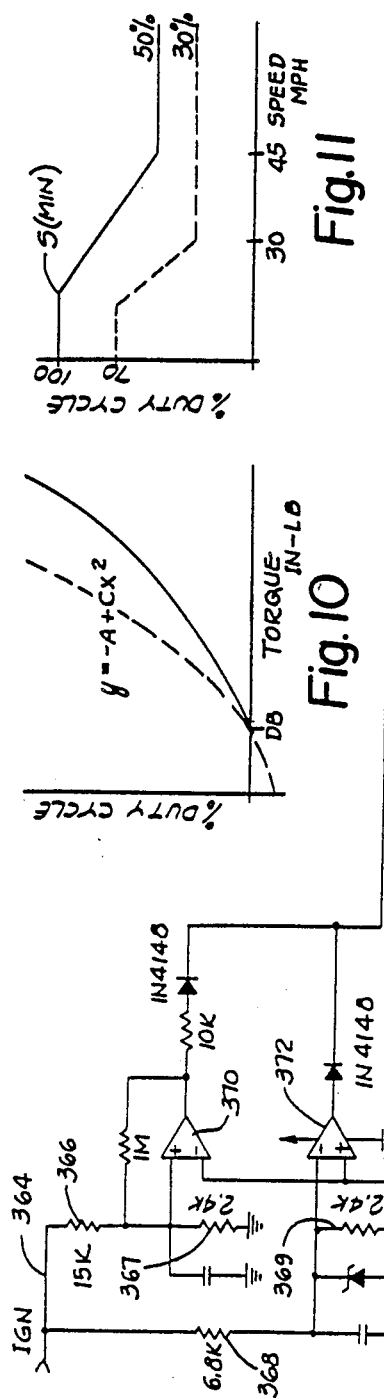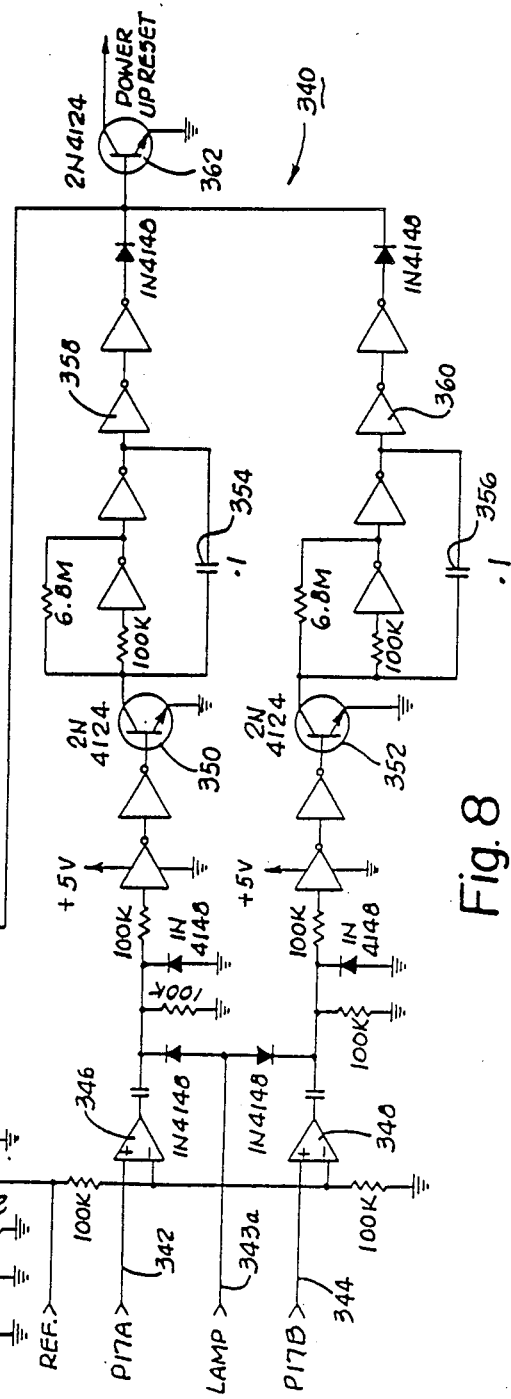
Fig.11
Fig.10
Fig.8

ANALOG-TO-DIGITAL CONVERTER

This is a division of application Ser. No. 620,188, filed 6-13-84 U.S. Pat. No. 4,621,327.

DESCRIPTION

1. Technical Field

The present invention relates to a motor assisted power steering control unit.

2. Background Art

Most motor vehicles employ an assist mechanism to aid a vehicle user in steering the motor vehicle. Hydraulic assists are most common. These assists utilize a pump and a hydraulic system for selectively applying a turning assist force to a vehicle steering assembly.

The pump maintains a fluid pressure in the hydraulic system when the vehicle motor is running. This pressure is transmitted to a hydraulic actuator in response to a user applied torque from the steering column. The amount of steering assist is related to the magnitude of this torque since this torque dictates the magnitude of the force applied to the actuator.

Proposals have been made to replace the hydraulic system with an electrically powered vehicle steering assist. These proposals envision an electric motor coupled to a steering shaft which can be selectively energized to aid the user in turning that shaft.

An electric power steering assist system is believed to be cheaper, lighter, and more reliable than a comparable hydraulic system. In addition, a more sophisticated torque sensing and assist determination procedure is possible by using state-of-the-art electronic monitoring and control circuitry.

DISCLOSURE OF THE INVENTION

The present invention relates to an implementation of an electronic power steering system having unique features for enhancing safety, reliability, and performance. The unit has redundant error checking, diagnostic storage of system operations, and ability to communicate sensed diagnostic parameters to the outside world. A customizable energization format allows the user to adjust the vehicle steering to meet his or her driving style and preference.

The disclosed power steering system has a D.C. motor coupled to a vehicle steering shaft to assist an operator in maneuvering the vehicle. A control unit for the system includes first and second controllers for calculating a desired motor energization sequence based upon a monitoring of vehicle speed and the steering torque applied by an operator through a vehicle steering shaft. A first controller energizes the motor and a second controller coupled to the motor monitors this energization to ensure the first controller is properly operating. A relay switch coupled to an output from the second controller can de-activate the motor in the event the first controller is not energizing that motor in accordance with the sequence determined to be appropriate by the second controller.

This redundant calculation and checking procedure reduces the likelihood of the control unit applying a totally inappropriate energization sequence to the assist motor. If the first controller produces an erroneous output for motor assist and the second controller determines this calculation to be in error, the relay is opened, thereby de-energizing the motor and removing the power assist.

A failure mode parameter is stored in a memory unit. At a later time when diagnostic steps are taken to correct the failure, these failure mode parameters can be accessed and analyzed for determination as to the failure mechanism.

A preferred motor energization sequence is achieved by pulse width modulating the armature windings of a D.C. motor having an output shaft coupled through a gear reducer to the vehicle steering shaft. The duty cycle of this pulse width modulation determines the amount of power assist applied in response to a particular user input.

In accordance with a preferred procedure, the duty cycle or "on time" of the armature windings depends upon both user applied torque and vehicle speed. The control unit includes a non-volatile memory in which various parameters or constants can be stored for varying the vehicle response to a particular speed and torque.

The relationship between a preferred duty cycle (percentage of on time) and torque forms the shape of a truncated parabola. The Y axis or ordinate in this relationship represents the duty cycles and the X axis or abscissa represents the torque. The parabola is truncated so that only after a certain minimum torque has been applied by the user is the assist motor energized. Thus, in the event the vehicle is traveling in a relatively straight line, the application of small torques on the steering column by the user will not result in motor energization.

The shape of the parabola is determined by the parameters or constants stored in the memory of the control unit. By selecting various ones of these parameters, the vehicles response to a particular torque can be modified to meet the user's requirements. A set of user actuatable switches on the vehicle dashboard cause the two programable control units to utilize different parameters in calculating a preferred motor energization.

The preferred controllers are programmable microprocessors that monitor a number of analog inputs in determining the proper motor energization sequence. Two of these inputs are torque inputs from a torque sensor coupled to the steering column. A novel analog to digital converter produces a digital representation of the torque from an analog input.

This converter includes a comparator with two inputs. One input is connected to the analog input and the second is connected to a current source for charging a capacitor. The microprocessor initiates capacitor charging and starts a timer running. When the two comparator inputs are equal, i.e. the capacitor has charged to the analog input, the microprocessor notes a change in output state from the comparator and stops the timer. So long as the capacitor charges at a uniform rate, the time value corresponds to the analog input and is thus a digital representation of that input.

From the above it should be appreciated that one object of the invention is the provision for a safe, reliable and easily modifiable steering control unit for use in conjunction with an all electric power steering system. These and other objects, advantages and features of the invention will become better understood when a detailed description of a preferred embodiment of the invention is described in conjunction with the accompanying drawings.

BRIEF DESCRIPTION OF THE DRAWINGS

FIG. 8 shows reset circuitry for resetting each of the microprocessors in the event a malfunction is sensed.

FIG. 9 shows a specialized circuit for generating a motor energization signal of a particular duration in response to an output from one of the two microprocessor controllers and FIGS. 10 and 11 are graphs illustrating D.C. motor energizations as a function of torque and vehicle speed.

BEST MODE FOR CARRYING OUT THE INVENTION

Figure 1:
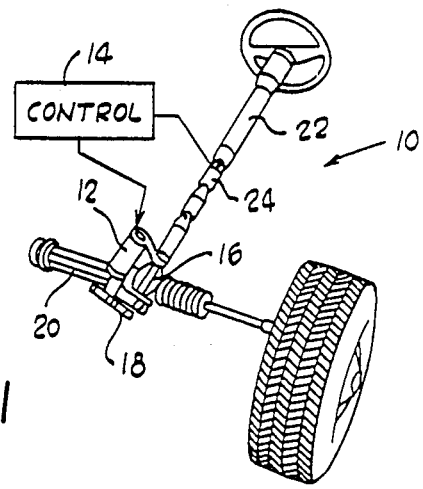
FIG. 1 is a perspective view of a vehicle steering system having a D.C. powered motor assist.
Figure 2:
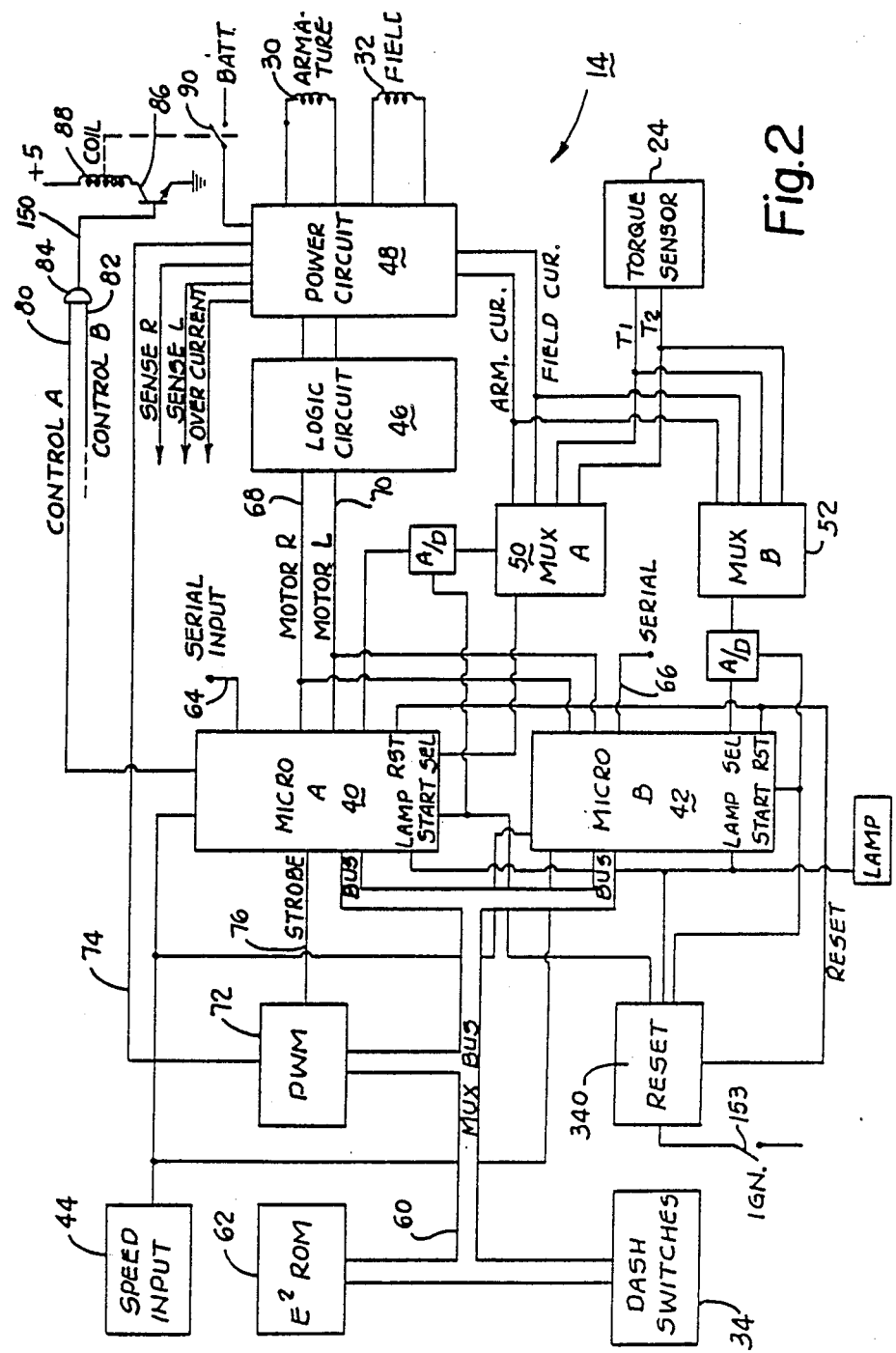
FIG. 2 is a schematic of a control unit for selectively energizing the D.C. motor.

Turning now to the drawings and in particular FIGS. 1 and 2, a steering assembly 10 for a motor vehicle is shown. The assembly includes a D.C. motor 12 for assisting a vehicle user in steering the vehicle. The D.C. motor 12 is energized by a control unit 14 to rotate a vehicle pinion shaft 16. A coupling between the motor 12 and the pinion shaft 16 is accomplished by a reducing gear 18 to achieve a proper correlation between rotation of a D.C. motor output shaft and pinion shaft rotation. The pinion shaft engages a rack 20 which transmits turning forces to the vehicle.

The control unit 14 monitors the torque transmitted through a vehicle steering column 22. A torque sensor 24 coupled to the column 22 provides an electrical signal indicative of the torque applied by the vehicle user. The control unit 14 also monitors the speed of the vehicle. The torque applied through the column 22 and speed of the vehicle are used by the control unit 14 to determine a suitable energization for the motor 12.

The D.C. motor 12 includes armature and field windings 30, 32 (see FIG. 2) which are energized in response to the control unit 14. The armature windings 30 are pulse width modulated with a duty cycle which can vary from 0 to 100%. The field windings 32 are energized and de-energized whenever pulse width modulation is to be applied to the armature windings. The direction of current flow through the field windings determines whether the motor helps turn the vehicle to the right or to the left.

FIGS. 10 and 11 schematically illustrate the relationship between torque, percent duty cycle for the D.C. motor 12 energization, and speed of the motor vehicle. FIG. 10 illustrates the relationship between torque sensed and duty cycle of the motor. The greater the torque the user applies through the column 22 to the steering system 10, the more assist (greater duty cycle) the motor must provide to aid the user in maneuvering the vehicle. The FIG. 10 relation between torque and motor assist is a parabola truncated so that certain minimum torques result in no motor energization. When the vehicle is traveling down the highway the user can typically make minor corrections or adjustments in direction without the need for power steering assist.

FIG. 11 illustrates a feature of the invention not readily achievable with a hydraulic power system. The FIG. 11 representation indicates two possible variations of maximum assist (in percent duty cycle) with vehicle speed. The solid line representation indicates that at low speeds one motor energization sequence provides 100% duty cycle assist until the vehicle reaches a speed designated S(min). Once this speed has been reached the maximum assist ramps down to a value of 50% duty cycle at a speed of 45 miles per hour. From that point on, the maximum assist available from the unit 14 is a 50% duty cycle.

The FIG. 11 relationship can be altered by the user via input switches 34 (FIG. 2) located on the vehicle dashboard. These switches allow the maximum low speed duty cycle to be adjusted downward from 100% to a 70% maximum. A second switch allows an adjustment from the cut-off point at which no further reduction in assist occurs. In the FIG. 11 illustration, for example, this second switch can be adjusted to alter this high speed cut-off from 45 miles per hour to 30 miles per hour. A third switch, enables the maximum assist at this cut-off speed to be adjusted from 50% to 30%. Any combination of these switches is possible and the dotted line representation in FIG. 11 indicates a situation in which all three switches have been toggled from their solid line representation.

A fourth switch, also located on the dashboard, allows a different shaped parabola or base equation (see FIG. 10) to be chosen in controlling motor energization. This different shaped parabola might, for example, be illustrated by the dotted line representation of FIG. 10. The four switches 34 enable the user to adjust power steering performance of the vehicle to his needs or desires.

Returning now to FIG. 2, the control unit 14 is seen to include two microprocessors 40, 42 designated A and B microprocessors that interact with a number of other components to produce field and armature winding energization. The second microprocessor 42 checks the operation of the first microprocessor 40. This is a safety feature, the details of which will be described below. In addition to inputs from the torque sensor 24 and dashboard switches 34, each microprocessors 40, 42 monitors a speed input 44. Once a desired pulse width modulation scheme is calculated, the first microprocessor 40 causes a logic circuit 46 to activate a power circuit 48 that energizes the windings 30, 32.

Certain features of the control circuit 14 will be described in broad overview in conjunction with the FIG. 2 representation and details of the implementation of these features will be described in conjunction with detailed schematics of FIGS. 3-9. Each microprocessor 40, 42 monitors a number of analog signals including two analog signals T1, T2 from the torque sensor 24. Each microprocessor 40, 42 also monitors both the armature and field current produced in response to motor energization. These analog signals are seen to be routed through two multiplex units 50, 52. These multiplex units operate under control of their associated microprocessors to direct a single one of various analog inputs through the multiplex unit to an associated analog digital converter 54, 56.

A plurality of other inputs are seen coupled to both of the microprocessors 40, 42. Each of these processors for example, is coupled to a multiplexed parallel data bus 60. This bus 60 provides input paths for reading of the switch settings on the dashboard and for reading from and writing to an electrically erasable ROM unit 62 (EEROM). This memory unit 62 is non-volatile so that constants may be stored and not lost when the control unit 14 is de-energized. These constants include parameters for defining the various equations schematically illustrated in FIGS. 10 and 11 as well as indications of operation of the control unit 14. These later parameters are stored during operation of the control unit 14 and provide information in the event maintenance of the control unit 14 is needed.

The first microprocessor 40 generates the actual control signals for energizing the motor 12. Two outputs 68, 70 labeled motor right and motor left in FIG. 2 signal the logic circuit 46 whether the motor is to assist turning to the right or turning to the left. A signal on either of these two lines causes the logic circuit 46 to energize the field windings 32.

A specialized hard wired circuit 72 coupled to the bus 60 generates an output 74 to the power circuit 48 for energizing the armature windings 30. This circuit 72 includes a free running counter, a latch, and a comparator. The comparator compares the count on the counter with a number which has been previously transmitted via the multiplex bus from the microprocessor 40 to the latch when activated by a strobe signal 76. When an equality exists between these two numbers, the circuit 72 generates a motor off signal 74 and the armature windings 30 are de-energized. The windings 30 remain de-energized until the counter sequences to its maximum valve (255) and sequences back to zero.

An important feature of the invention is the monitoring operation provided by the second microprocessor 42. The second microprocessor includes an algorithm or operating system which is similar to the first microprocessor operating system. The second microprocessor 42 includes inputs for sensing all the inputs made to be available to the first microprocessor 40 and therefore is capable of calculating a desired or appropriate energization sequence for the armature windings 30. In addition, the B microprocessor (like the A microprocessor) monitors operation of the motor by sensing the armature current field current as well as the direction of motor energization. In the event the second microprocessor 42 calculates an energization sequence different from the first microprocessor 40, the second microprocessor can take corrective steps to power down the system and reset the first microprocessor 40.

To remove all assist each microprocessor includes a control output 80, 82 coupled to an AND gate 84 for turning off a transistor 86 that energizes a coil 88. This coil 88, when energized, closes a contact 90 which couples power to the armature and field windings 30, 32. Thus, if the coil 88 is not energized the armature cannot be energized in response to outputs from the first microprocessor 40. Since both microprocessor control outputs 80, 82 to the AND gate 84 must be high in order to maintain the transistor 86 in a conducting state, each microprocessor 40, 42 has a mechanism for shutting down the power assist.

Detailed implementation of the various features discussed above will be described in conjunction with the detailed schematics in FIGS. 3-9.

Motor Winding Energization

Figure 3:
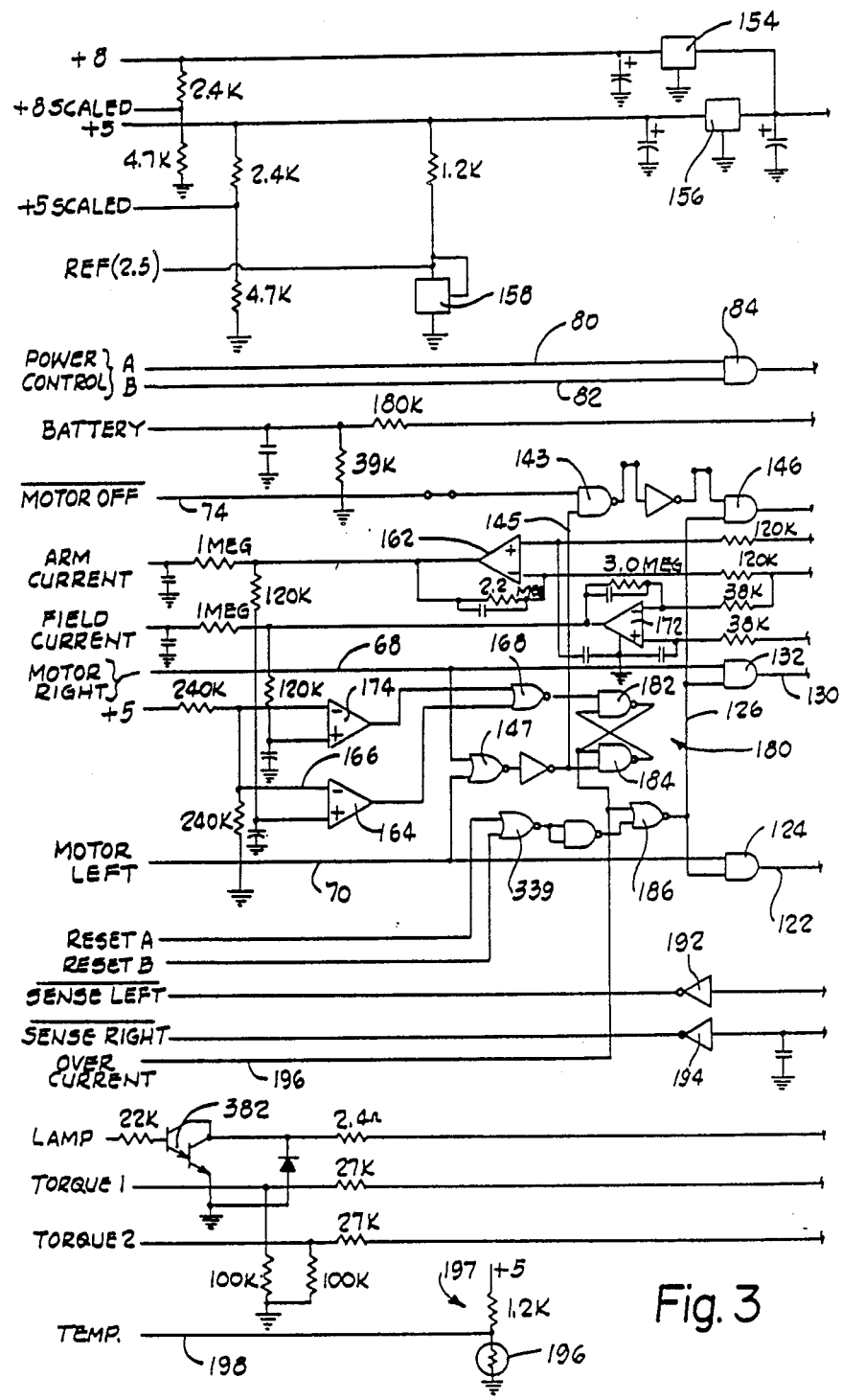
FIGS. 3 and 4 show in greater detail circuitry for energizing the armature and field windings of the D.C. motor.
Figure 4:
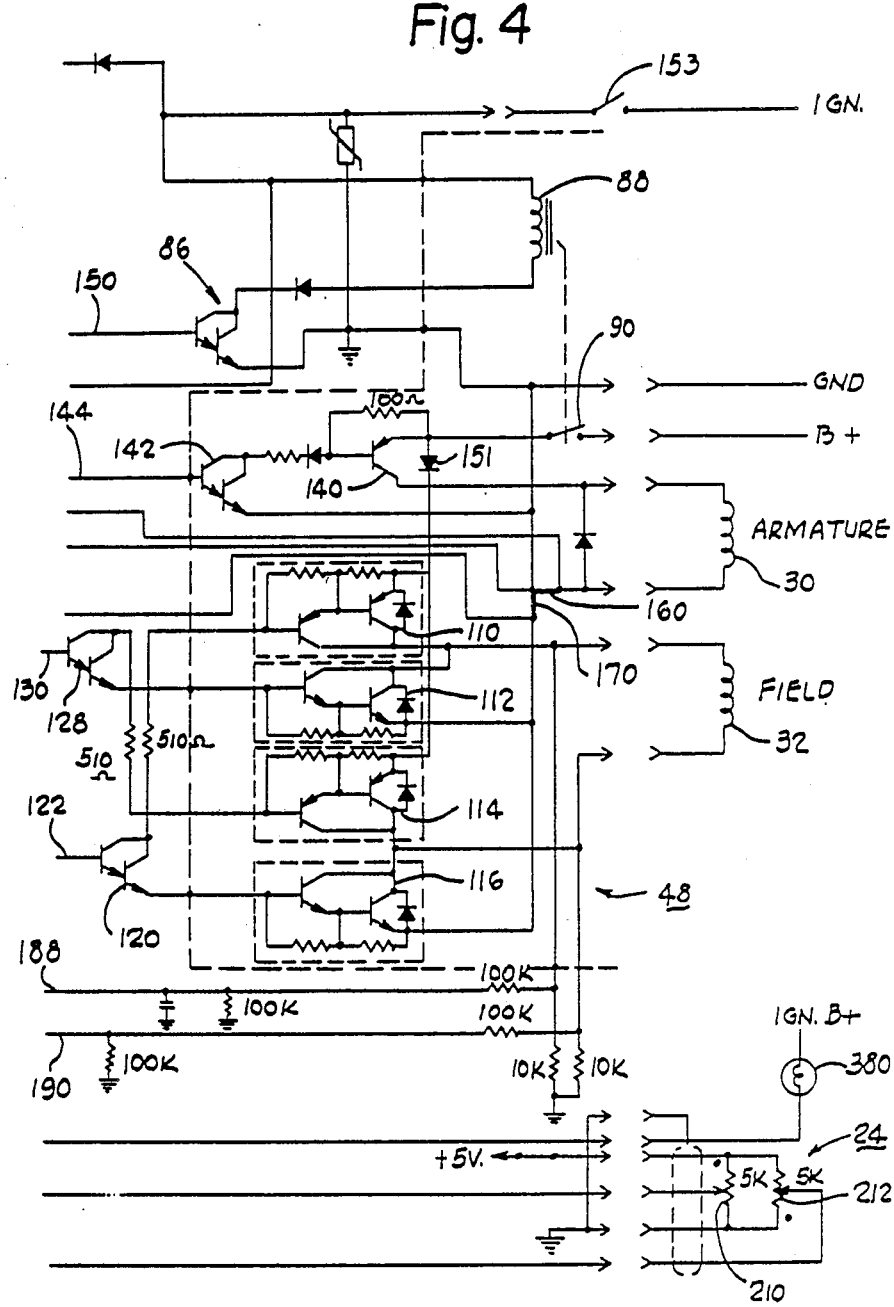

Turning to FIGS. 3 and 4, the logic circuit 46 and power circuit 48 as well as inputs to those circuits are shown. The power circuit 48 includes four transistor drivers 110, 112, 114, and 116. The conductive state of these four transistors dictates the direction of field winding energization and therefore the direction of motor assist.

A top transistor 110 and bottom transistor 116 are seen to be coupled to a first control Darlington transistor 120. An input 122 to this transistor 120 is generated by an AND gate 124 (FIG. 3) having one input 70 corresponding to the motor left signal from the first microprocessor 40. A second input to this AND gate 124 is generated by a disable line 126. If both the disable line 126 and the motor left input 70 are high, the AND gate 124 generates a high output which turns on the transistor 120 (FIG. 4). This energizes the two transistors 110, 116 which in turn energize the field windings 32.

In an analogous fashion, a Darlington transistor 128 is energized in response to a signal at that transistor's input 130 from an AND gate 132. This gate has one input 68 corresponding to the motor right signal from the first microprocessor 40 and a second input coupled to the disable line 126. Thus, assuming the disable line 126 is high, a high signal from the microprocessor along the input 68 energizes the Darlington transistor 128 which in turn energizes the two transistors 112, 114 to produce current flow in an opposite sense through the field windings 32. In summary, depending upon the status of the two inputs 68, 70 the field windings are energized to cause current flow into the field windings 32 and produce motor energization in an appropriate direction.

The armature windings 30 are energized in response to the turning on and off of a power transistor 140 (FIG. 4) in response to a switching Darlington transistor 142. The switching transistor 142 is coupled to the output 144 of a third AND gate 146 having an input tied to the disable line 126. The second input to this AND gate 146 is determined in part by the status of the motor off signal 74 from the pulse width modulation circuit 72 (see FIG. 2). To pulse width modulate the armature windings 30, the transistor 140 is energized and de-energized in response to a series or train of pulses along the input 74 (assuming the disable line 26 has not been pulled low).

By referring to FIG. 3 it is seen that the pulse train on input 74 only reaches the AND gate 146 if and only if a NAND gate 143 passes that pulse train. The NAND gate 143 has a control input 145 generated by a NOR gate 147. The two inputs 68, 70 to the NOR gate correspond to the motor right and motor left signals so the armature windings 30 are pulse width modulated only when the field windings 32 have been energized.

An additional input 150 (FIG. 4) controls the status of the coil 88 (FIGS. 2 and 4). The input 150 is generated by the AND gate 84 whose status is determined by the input status of the two control signals 80, 82 from the microprocessors 40, 42. A high input on the line 150 maintains the transistor amplifier 86 in a conductive state which in turn energizes the coil 88. This coil in turn closes the contact 90 so that whenever both inputs 80, 82 to the power circuit are high, the contact 90 is closed. This contact 90 directs a voltage labeled B+ (battery) on the power circuit to the power transistor 140. In the event the contact 90 is opened in response to a change in state of the two inputs 80, 82, power is disrupted and the armature windings 30 de-energized. A diode 151 directs B+ voltage to the transistors 110, 112, 114, 116 so that an opening of the contact 90 also de-energizes those transistors and thus de-energizes the field windings 32.

Power to the coil 88 is supplied by a vehicle ignition switch 153 at the top of FIG. 4. This switch 153 also transmits power from the vehicle battery to three voltage regulators 154, 156, 158 (FIG. 3). These three voltage regulators 154, 156, 158 generate regulated voltages for the control unit 14. These voltages are also inputs to the two multiplex units 50, 52 but have been deleted from the FIG. 2 representation of those multiplex units 50, 52, for ease in representation. They are illustrated, however, in the detailed schematics shown in FIG. 5 and FIG. 6.

Motor Response Monitoring

In addition to producing controlled energization of the field and armature windings 30, 32, the FIGS. 3 and 4 circuits monitor that energization and generate field current, armature current, over current, sense right, and sense left signals for each of the microprocessors. An armature current shunt 160 (FIG. 4) provides a voltage output proportional to the current through the armature. The two sides of the shunt 160 are connected as inputs to a non-inverting amplifier 162 (FIG. 3). The output labeled armature current to the left of FIG. 3 is an analog signal ranging in value from approximately 3/10 of a volt to 3 volts. An output from the differential amplifier 162 is also coupled to the non-inverting input of a comparator amplifier 164 having a reference input 166 held at 2.5 volts. So long as the output from the amplifier 162 is less than 2.5 volts, the amplifier 164 generates a low output which is coupled to a NOR gate 168. This low input to the NOR gate maintains the output from that gate high. In the event the voltage on the comparator 164 goes to a value greater than 2.5 volts, a high output is generated which flips the output from the NOR gate 168 low.

In an analogous fashion, a second shunt 170 (FIG. 4) monitors current through the field windings 32. This shunt 170 generates two inputs to a second differential amplifier 172 (FIG. 3) which generates an output signal corresponding to the field current. A comparator amplifier 174 has an inverting input tied to the reference signal of 2.5 volts so that whenever the signal generated by the differential amplifier 172 exceeds 2.5 volts, the NOR gate 168 receives a high signal causing its output to go low.

The NOR gate 168 has its output coupled to a reset circuit 180 comprising two NAND gates 182, 184. A low output from the NOR gate 168 causes the output from the NAND gate 182 to go high. This high signal is coupled to an additional NOR gate 186 seen directly beneath the reset circuit 180. A high input signal to this NOR gate 186 causes that gate to generate a low signal on the disable line 126. Since this disable line 126 is coupled to the three AND gates 124, 132, 146 an over current condition in either the armature or field shunts disables motor energization by blocking transmission of the motor right, motor left and motor off signals to the power circuit 48.

Referring again to FIG. 4, two conductors 188, 190 monitor the energization signals applied to the field windings 32. These signals 188, 190 are routed through two inverters 192, 194 (FIG. 3) and then are coupled to input pins on the microprocessor. Unlike the armature current and field current signals discussed previously the outputs labeled sense left and sense right do not pass through either multiplex units 50, 52 seen in FIG. 2. By monitoring both these outputs from the power circuit, the microprocessors 40, 42 determine whether the power circuit is properly responding to the motor left and motor right inputs 68, 70.

One final input to the microprocessors is an over current condition which is generated from an output 196 from the logic circuit. During normal operation, this signal is low, since it is coupled to the output from the NAND gate 182. When this gate switches state in response to an over current condition sensed by either of the two comparator amplifiers 164, 174, the over current signal goes high to not only pull the disable line 126 low but also apprise the microprocessors 40, 42 of this condition.

Figure 5:
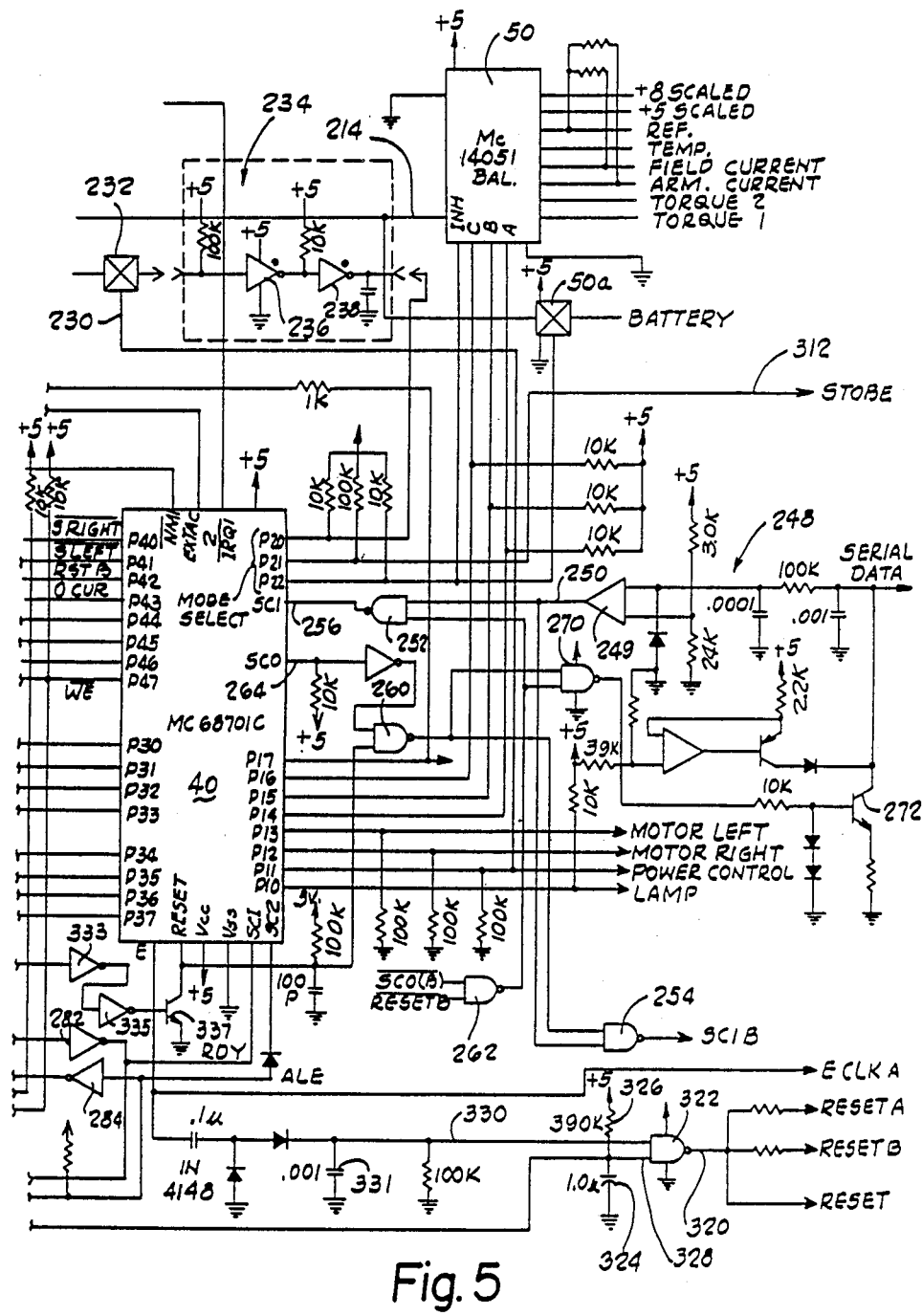
FIGS. 5, 6 and 7 illustrate two microprocessor controllers and input circuitry to those controllers.
Figure 6:
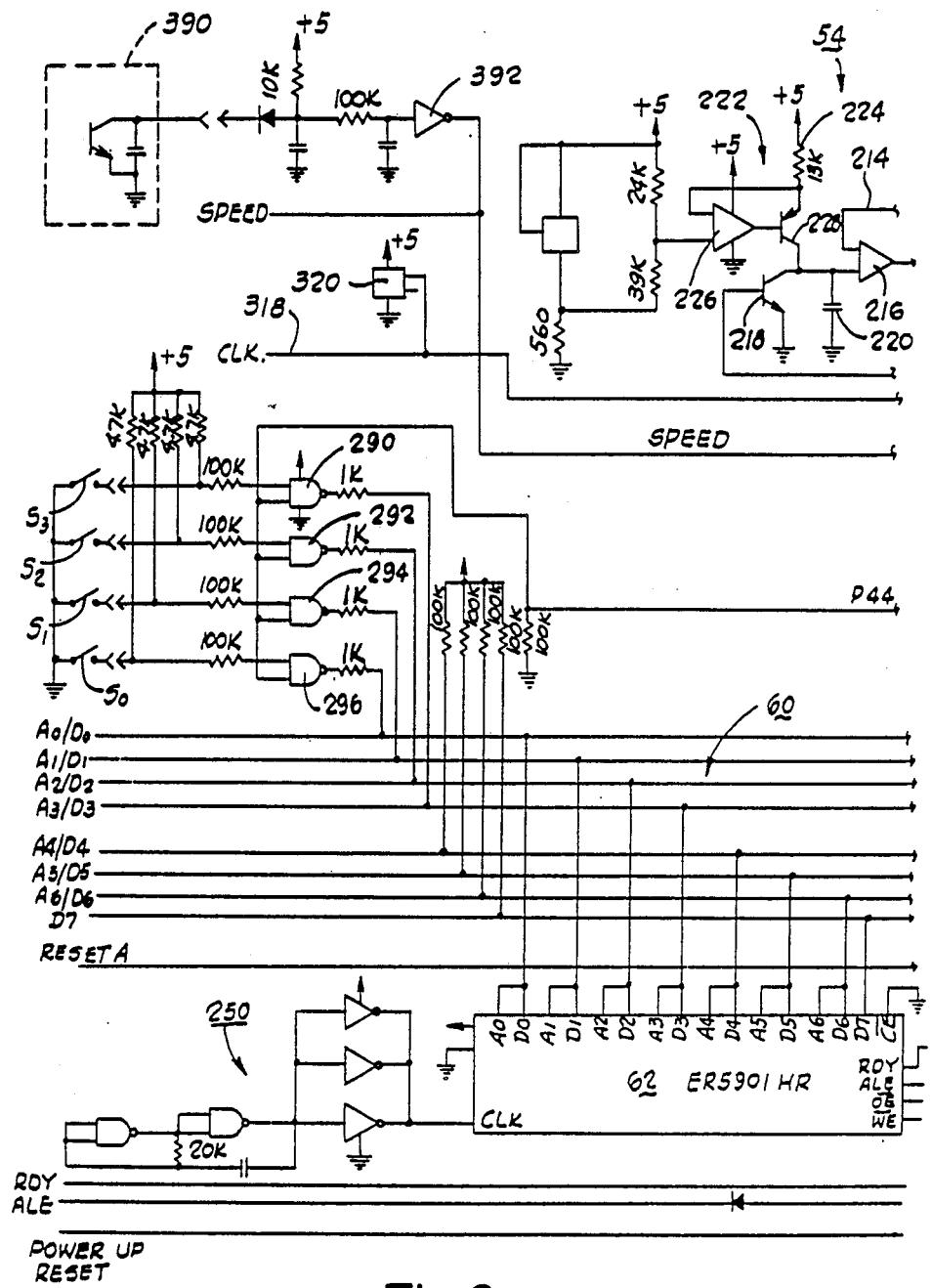
Figure 7:
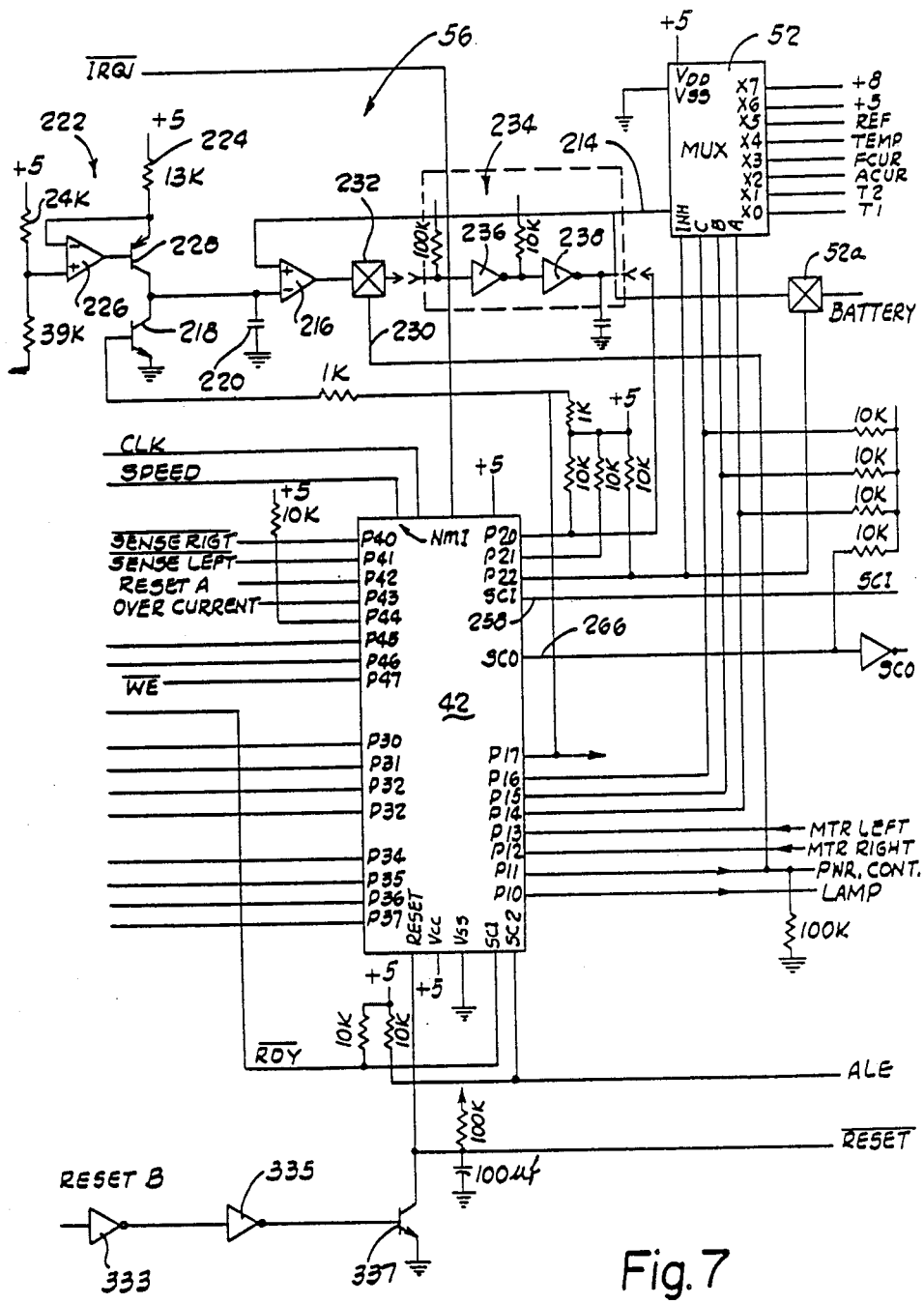

Turning briefly to FIG. 5, the multiplex unit 50 is seen to have eight inputs. Five of these inputs have been discussed and the remaining three are generated from circuitry at the bottom of FIGS. 3 and 4. A linear resistive element 196 is positioned in contact with a control unit heat sink (not shown) to monitor the temperature of the control unit. This resistive element forms a portion of voltage divider 157 having an output 198 coupled to the two multiplex units 50, 52. If this signal 198 indicates the control unit 14 has reached too high a temperature, the operating systems in the microprocessor can shut down the motor assist.

The two signals labeled torque 1 and torque 2 in FIGS. 3 and 5 are generated by the torque sensor 24. By applying a torque through a wiper blade (not shown) coupled to the steering column 22 the user varies the output on two potentiometers 210, 212 both of which are taken into account in calculating the torque applied through the steering column. The use of two potentiameters means that when one torque signal is increasing, the second will be decreasing and the effects due to noise or spurious spikes in the system tends to cancel while changes in the outputs due to an input from the user will be registered and taken into account by the microprocessor.

Analog-To-Digital Conversion

Returning to FIG. 5 and 6, each multiplex unit 50, 52 receives the same eight analog inputs and couples one of the eight to an output 214 under control of the multiplex units associated microprocessors 40, 42. Pins P14, P15, P16, and P22 on the respective microprocessors 40, 42 are coupled to input pins A, B, C, INH on the multiplex units 50, 52 and determine which of the eight inputs to this multiplex unit will be passed to an output conductor 214. A ninth input for sensing the vehicle battery voltage is coupled to two analog switches 50a, 52a and passed to the conductor 214. A gate input to each switch 50a, 52a is coupled to pin P22 on its associated microprocessors 40 or 42.

The output 214 is coupled to a comparator amplifier 216 included in the analog to digital converter 54, 56 associated with each multiplex unit. The functioning of each of the analog digital converters 54, 56 is identical and will be described in conjunction with the A to D converter 54 associated with the first microprocessor 40 (See FIG. 6). Pin 517 on the microprocessor 40 is seen coupled through a one kilohm resistor to the base input on a NPN transistor 218. A high output from pin P17 causes this transistor to turn on and discharge a capacitor 220. To convert the analog signal from one of the nine inputs to a digital input to the microprocessor, the microprocessor 40 first couples a selected one of the nine inputs to the conductor 214 and then discharges the capacitor 220 by turning on the transistor 218. At that time a counter internal to the microprocessor is read and its count stored in a storage register. The microprocessor then turns off the transistor 218 and awaits a change in state from the comparator amplifier 216.

Once the transistors 218 is turned off, a constant current source 222 charges the capacitor 220 at a constant rate so that the time it takes the comparator 216 to change states is an accurate indication of the analog input transmitted along the output 214. The constant current source 222 includes a precision resistor 224 and a constant voltage source 226 to maintain the current through a charging transistor 228 constant to assure the time it takes the capacitor to charge to a given value can be used to determine the magnitude of the output 214 from the multiplex unit 50. So long as the gate input 230 (FIG. 5) to an analog switch 232 remains high, the output from the comparator 216 is coupled to pin P20 on the microprocessor 40 via a buffer 234 including inverting gates 236, 238. The gate input 230 to the analog switch 232 is seen to be coupled to the power control output from the microprocessor at pin P11. So long as the power control is maintained high, the output from the comparator 216 will be coupled to input pin P20. This input remains low so long as the capacitor has not yet changed to the value of the output 214 from the multiplex unit 50. When a change in state occurs, however, the microprocessor 40 senses this change at pin P20 and notes the contents of a free running counter which were earlier stored in memory, performs a subtraction of two values and stores the difference as a digital equivalent for the analog input being sensed. So long as the charging rate of the capacitors 220 is accurately maintained, this digital value will yield an accurate indication of the analog signal from the multiplex unit 50.

Serial Communications

Each of the microprocessors 40, 42 utilizes a communications circuit 248 (see FIG. 5) to send and receive serial data. In an input mode of operation, serial input signals are passed through a comparator amplifier 249 having an output 250 connected to two NAND gates 252, 254. A first NAND gate has its output coupled to a serial input pin on the first microprocessor 40. The second NAND gate 254 is coupled to a serial input pin on the second microprocessor 42. So long as the output from two NAND gates 260, 262 remains high, inputs on a communications input to the circuit 248 are transmitted to their respective microprocessors 40, 42 via the gates 252, 254.

On an output side, the two microprocessors 40, 42 each include a serial output pin coupled to the two NAND gates 260, 262. These gates are in turn coupled to an additional NAND gate 270 having an output tied to the base input of an NPN transistor 272. By selectively turning on and off this transistor 272 the status of the serial data line can be controlled by either microprocessor 40, 42.

As will be seen in conjunction with the description of the microprocessors operating system, the serial data path can be utilized for changing certain constants stored in the memory unit 62 or retrieving those constants in that unit for diagnostic purposes.

Parallel Data Bus

Each of the microprocessors 40, 42 has its input/output port 3 tied to a parallel data bus 60 used for transmitting data between the microprocessors 40, 42 the memory unit 62, and the pulse width modulation circuit 72 for controlling the duty cycle applied to the armature. This bus 60 multiplexes both address and data information to the memory unit 62. The memory unit 62 (FIG. 6) has its own oscillator 280 coupled to a clock input on the memory unit. Four pins labeled RDY, ALE, OE, and WE on the memory unit 62 contrl reading and writing to that unit. The ready signal (RDY) is an output from the memory unit 62 to the two microprocessors and is buffered by an inverter amplifier 282 (FIG. 5). The input labeled ALE is similarly buffered by an input inverter 284. This signal can also be generated by either microprocessor. The signals labeled output enable ($\overline{OE}$) and write enable ($\overline{WE}$) are active low and tied directly to pins P45 and P47 on the two microprocessors 40, 42.

To read or write data to the memory 62 an address is first put on the bus 60 and the memory signaled by an output on the address latch enagle (ALE) signal that an address has been presented. Next, the data to be read or written is presented to the bus 60 by either the memory 62 or the microprocessor. The $\overline{OE}$ signal informs the memory to present data and the $\overline{WE}$ signals the memory to latch data from the bus 60. The memory 62 is slower than the microprocessor so the ready signal (RDY) is needed for the the memory to inform the microprocessor that it is ready to read or write data.

The dashboard switches 34 are also coupled to the multiplex bus 60. These switches have been labeled SO-S3 in FIG. 7 and are seen to be tied to thelow order four bits on the bus 60 through a series of NAND gates 290, 292, 294, 296. When these switches SO-S3 are not being read, an output from pin P44 is held low so that the output from these four NAND gates 290, 292, 294, 296 is held high. To sample the condition of these switches, pin P44 (on processor A only) is pulled high and the four lower bits on the bus 60 sampled by the microprocessor. If a particular switch is closed, the input to its respective NAND gate goes low thereby producing a high output from its associated NAND gate. An open switch condition produces a high input to the NAND gate thereby generating a low output from that gate.

Pulse Width Modulation Circuit

The pulse width modulation/motor off circuit 72 is also coupled to the multiplex bus 60. The circuit 72 (FIG. 9) incldues a latch 310 for storing an eight bit number (O-255) presented on the bus 60 from the microprocessor 40. A strobe signal 312 (FIG. 5) from pin P21 coupled to this latch 310 causes the data on the bus 60 to be latched and presented to a comparator 314 having an output for generating the motor off signal. The comparator 314 compares the signals presented from the latch 310 with an input from a free running counter 316 having a clock input 318 coupled to a clock output from the microprocessor 40 having a frequency of 1 megahertz.

When the output from the counter 316 is less than the latch output, the comparator 314 produces a high output along the $\overline{\text{motor off}}$ line. It should be recalled that this signal is coupled to the power circuit 48 and is used to de-energize or energize the armature windings. The comparator 314 produces a low output along the $\overline{\text{motor off}}$ line whenever the latch output is equal or greater than the output from the free running counter 316.

So long as the microprocessor 40 does not modify the contents of the latch 310, a pulse train at a frequency of 2KH$_Z$ with unchanging duty cycle will be generated along the $\overline{\text{motor off}}$ line. The on time or duty cycle of this pulse train will dicatate the on time or duty cycle of the armature windings. To modify this duty cycle, the microprocessor 40 strobes a different value into the latch 310 causing the transition point from the comparator 314 to change and therefore the on time or duty cycle of armature winding energization to be modified.

Reset

Figure 9:
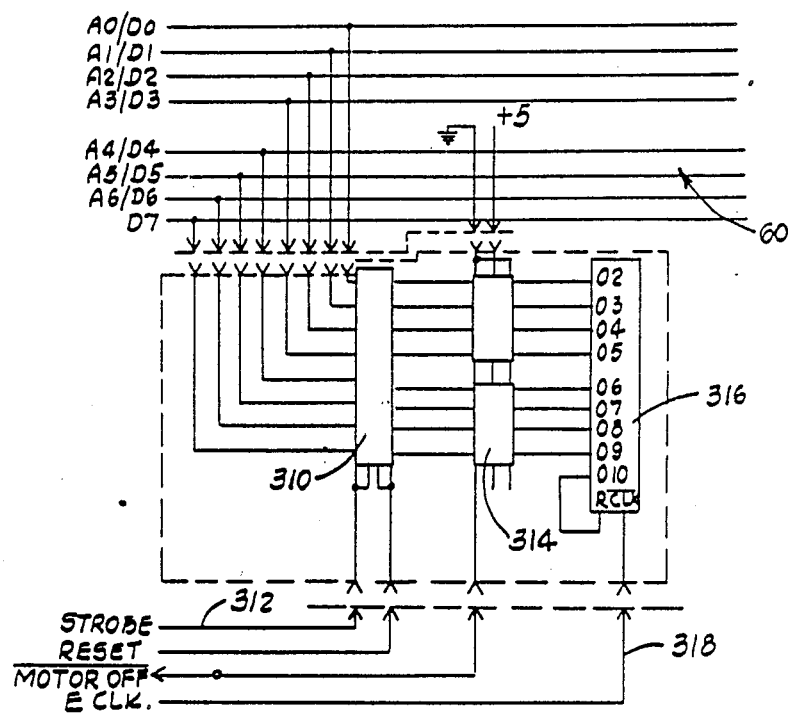

When the control unit 14 is first energized as the ignition switch 153 is closed, a reset signal is generated from an output 320 of a NAND gate 322. This reset pulse is maintained for the time it takes for a capacitor 324 to be charged through a resistor 326 connected to +5 volts. This brings one input 328 to the NAND gate 322 high and assuming the other input 330 is high the NAND gate output 320 goes low. The input 330 is maintained high by a charge on a capacitor 331. The capacitor is periodically charged by the same clock output from the microprocessor 40 used to clock the counter 316 (FIG. 9).

This clock signal is internally generated by the microprocessor. By using this signal to charge the capacitor 331, a check of the microprocessor 40 is performed. If that signal is not present the input 330 to the NAND gate 322 goes low.

The NAND gate output 320 is coupled to the reset input on both microprocessors 40, 42 through a pair of buffer amplifiers 333, 335 (FIGS. 5 and 7) which turn on a transistor 337 when the NAND gate output 320 goes high. The reset outputs are also coupled to an NOR gate 339 in the logic circuit 46 to pull the disable line 126 low. These rest signals, labeled RESET A and RESET B in the figurs, can also be generated by output pin P42 on the two microprocessors 40, 42.

After the capacitor 324 charges, the NAND gate input 328 can again be pulled low by a reset circuit 340 (FIG. 8). The circuit 340 has two inputs 342, 344 from output pin P17 on the two microprocessors 40, 42. Each of these inputs is coupled to an associated comparator amplifier 346, 348 having a reference input defined by a voltage divider which divides a 2.5 volt reference signal from the volage regulator 158 (FIG. 3). So long as both microprocessors 40, 42 are properly performing their operating systems, a series of pulses are generated at pin P17 which cause the output from the comparator amplifiers 346, 348 to periodically go high. When this happens, a pair of NPN transistors 350, 352 are turned on to provide a discharge path for a pair of capacitors 354, 356.

Periodically discharging the two capacitors 354, 356, maintains the output of two amplifiers 358, 360 high which maintains a base input to a reset transistor 362 low. In the event, however, the series of pulses are not generated by pin P17 of one of the two microprocessors 40, 42, one of the capacitors 354, 356 charges to a threshold value, and its associated inverting amplifiers 358 or 360 goes low to turn on the transistor 362 which in turn is coupled to the input 328 (FIG. 5) to the NAND gate 322. This proceduces a reset pulse 320 to both microprocessors.

Returning to FIG. 8, the reset circuit 340 also includes an over voltage and under voltage protection feature for resetting the microprocessors. At the upper left hand corner of FIG. 8, an ignition input 364 is seen tied to two voltage dividers defined by four resistors 366, 367, 368, 369. A first voltage divider defined by the resistors 366, 367 is coupled to a first comparator amplifier 370 for monitoring an over voltage condition on the ignition input 364. In the event this voltage exceeds the reference value of 2.5 volts a reset output is sent to the transistor 362. Similarly, a comparator amplifier 372 produces an output for turning on the transistor 362 in the event the ignition signal 364 is less than a predetermined limit. In accordance with a preferred design, these limits are 9 and 15.5 volts respectively.

An additional input to the reset circuit 340 is a lamp signal 343A coming from pin P10 of both processors 40, 42. This signal is high for four seconds following a power-up or a reset sequence and disables the lower part of the reset circuit 340 for that time. That gives both procesors time to go through their respective start-up procedures.

Miscellaneous Circuits

Other circuit features not heretofore described will now be summarized. An indicator lamp 380 (FIG. 4) is located on the vehicle dashboard to give a visual indication that the power control unit 14 is operating. On power-up, each microprocessor 40, 42 energizes output pin P10 to turn on a transistor amplifier 382 (FIG. 3) and thereby energize the lamp 380. This occurs, however, only when the contrl unit 14 receives a cold reset. In a preferred design, the lamp 380 is energized for a period of four seconds on power-up.

As mentioned above in relation to FIGS. 10 and 11, the algorithm for producing a preferred pusle width modulation of the D.C. motor monitors vehicle speed to determine an appropriate assist for the motor. A speed sensor 390 (FIG. 6) produces a series of pulses whose repetition rate is proportional to the vehicle speed. The sensor 390 is coupled to a non-maskable interrupt pin on each of the microprocessors 40, 42 via an output from a NOT gate 392. Since this input is non-maskable, the receipt of each of these pulses causes the microprocessors to branch to an interrupt handling routine which notes the receipt of a pulse, and increments a storage memory internal to each microprocessor. By monitoring the number of pulses received over time, each microprocessor is provided with an indication of the vehicle speed.

Software

Each of the microprocessors 40, 42 preferably comprises a Motorola MC68701C microcomputer containing two kilobytes of EPROM. The operating system stored in this memory is substantially similar for each of the microprocessors. The second microprocessor 42 does not directly control motor energization, however, so that the motor left and motor right outputs from pin P13 and P12 on the first microprocessor 40 are not generated by the second microprocessor 42. Instead, these pins are used by the second microprocessor 42 to sense the motor right and motor left outputs from the first microprocessor 40.

Both microprocessors monitor performance of the motor in response to the control signals generated by the first microprocessor. In addition, each microprocessor monitors the temperature and specified voltage values to determine whether these parameters are within expected variations. If they are not, the assist to the motor is either totally withdrawn or diminished depending upon the severity of the deviaton from expected limits.

The operating system is divided into three portions or segments. A first segment is performed on reset and is instituted either at power-up or in response to an input from the reset circuit 340 or directly from one of the microprocessors via pin P42.

A second major portion of the operating system is dedicated to processing interrupts. The interrupt processing updates the vehicle speed in response to the pulses at the non-maskable interrupt pin on the microprocessors. In addition, interrupt routines control the monitoring of the eight inputs from the multiplex units 50, 52, control the generation of signals to the PWM circuit 72 for modifying the pulse width modulation duty cycle of the motor, respond to an internal timer used in monitoring timed features during operation, and controls serial input and output to and from the microprocessors.

A third portion of the operating system is primarily responsible for calculating an optimum pulse width modulation duty cycle in response to the speed and torque inputs as well as determining the existance of a malfunction or condition which should be addressed by the microprocessors.

Restart

During the restart portion of the operating system one function each microprocessor performs is the loading of the constants stored in the memory unit 62 into RAM locations in each microprocessor. Table I below lists EEROM memory locations for representative ones of these parameters. Throughout the discussion regarding the microprocessor's operating systems these parameters will be referred to and their significance to the microprocessors operating system discussed.

TABLE 1

| Decimal Address | Contents |
| --- | --- |
| 00 | Coef. A for Base Equa. 0 |
| 01 | Coef. B for Base Equa. 0 |
| 02 | Coef. C for Base Equa. 0 |
| 03 | Coef. A for Base Equa. 1 |
| 04 | Coef. B for Base Equa. 1 |
| 05 | Coef. C for Base Equa. 1 |
| 06 | SO (in pulses) |
| 07 | Deadband |
| 08 | TORQZ1A |
| 10 | TORQZ2A |
| 12 | Slope of Speed-vs-Assist |
| 13 | Y intercept |
| 14 | Percent Min. |
| 36 | Driver Switch value |
| 48 | TORQZ1B |
| 50 | TORQZ2B |
| 94 | Recording Processor ID |
| 95 | Status Bytes ERRSTO |
| 96 | ERRCNT |
| 97 | ERRCNT +1 |
| 98 | ERRCNT +2 |
| 99 | ERRCNT +3 |
| 100 | ERRCNT +4 |
| 101 | ERRCNT +5 |
| 102 | Torque 1 A/D data |
| 103 | Torque 1 A/D data |
| 104 | Torque 2 A/D data |
| 105 | Torque 2 A/D data |
| 106 | Armature Current A/D data |
| 107 | Armature Current A/D data |
| 108 | Field Current A/D data |
| 109 | Field Current A/D data |
| 110 | Temperature A/D data |
| 111 | Temperature A/D data |
| 112 | Reference A/D data |
| 113 | Reference A/D data |
| 114 | System Voltage - +5 |
| 115 | System Voltage - +5 |
| 116 | Sensor Excitation Voltage +5 |
| 117 | Sensor Excitation Voltage +5 |
| 118 | Battery Voltage |
| 119 | Battery Voltage |

A microprocessor interrupt routine labeled EEROMR (Appendix A) accesses or reads data from the memory unit 62 and stores that data in a memory buffer in RAM in the microprocessor executing this routine. The calling routine in the microprocessor must transmit the address of the EEROM memory location as well as the destination location in the microprocessor. At restart, the microprocessors 40, 42 each get operating coefficient from the EEROM unit 62 needed in calculating a pulse width modulation for the motor 12.

Before these coefficients are obtained and stored, however, the microprocessor 40 also reads from the EEROM unit 62 error status information stored in the unit during previous operation of the control unit 14. This information is stored in decimal location 95 (ERRSTO, Table 1) and includes a bit map indicating previous error conditions and the severity of those conditions. If this memory location indicates control unit 14 experienced a non-recoverable fault condition, i.e. a fault so serious that the microprocessor was shut down during a previous operation, the restart algorithm again shuts down the microprocessor. This is a safety feature and avoids the possibility that erroneous motor energizations due to the existence of this fault will occur without diagnostic or corrective procedures being performed.

Memory locations beginning at address location 96 and progressing through location 101 in Table 1 indicate the specifies of fault occurrences. Location ERRCNT +3, for example, indicates an over temperature condition was sensed. The over temperature condition can be recoverable so that even though this error status was stored in memory during some previous period of operation, it does notnecessarily mean the control unit 14 should be shut down. These additional six memory locations (96-101) can be read via serial communications with the microprocessors 40, 42 during diagnostics of the control unit 14.

Foreground

After each microprocessor has executed the restart section of its algorithm, the program branches to a foreground portion which performs the bulk of the data processing needed to calculate a preferred pulse width modulation. This foreground section, however, is periodically interrupted by various interrupt routines which will be discussed below. In particular, the foreground routine needs information from the multiplex units to calculate an appropriate pulse width modulation or alternately make a determination that no vehicle assist is required.

On each pass through the foreground algorithm both torque inputs, torque 1 and torque 2, as well as one of the other analog inputs from the multiplex unit are sensed and stored. In addition, the foreground algorithm monitors various digital inputs to determine, for example, if an over current condition exist in the armature or field windings of the motor. Other digital inputs indicate that the field windings are energized in an appropriate manner so that the user is aided with motor energization and a correct directional sense.

During the portion of the foreground routine in which the pulse width modulation duty cycle or on-time is calculated, the microprocessor first utilizes the torque input in combination with the constants A, B, and C (which were loaded into the microprocessor during restart) to calculate a value on the graph illustrated in FIG. 10. As a first step in this process, the microprocessors determine whether the torque inputs from the multiplex units are less than a deadband constant (memory locations 07, Table 1) corresponding to a minimum torque on the FIG. 10 graph. If the sensors indicate the user is exerting a torque less than this minimum, no assist will be provided. Assuming an assist is needed, a first calculation represented by the base equation of FIG. 10 is performed.

Turning briefly to Table 1, memory locations 08-11 contain two byte constants labeled TORQZ1A and TORQZ2A. These are the digital representation for processor A of the output sigals from the torque sensor 24 when no torque is being exerted and are stored during fabrication of the control unit 14 or a time of service. It is the difference between these values and the values torque 1 and torque 2 from the multiplex units 50, 52 that are used in these calculations.

The on-time is a function of both torque input and vehicle speed so that a second calculation must then be performed. This calculation involves a monitoring of the vehicle speed to determine if the vehilce speed is greater than a minimum speedS(min) which is a preferred embodiment in seven miles per hour. The philosophy of the calculation as noted in FIG. 11 is to provide maximum assist at low speed so that if the speed is less than the minimum, the maximum assist is provided. For speeds greater than the minimum speed, a second duty cycle is calculated based upon the FIG. 11 graph. Once these two calculations are performed, they are combined by multiplying the assist calculated from equation (FIG. 10) by the percent reduction calculated by the speed vs. duty cycle relationship of FIG. 11.

In performing the above calculations, the microprocessor utilizes a number of constants from the memory unit 62. Returning to Table 1, two groups with three coefficients A, B, and C in each group are seen to be stored in decimal memory addresses 0-5. The status of switch SO dictates which group of three of these coefficients will be utilized for making the base equation calculations.

Decimal memory addresses 12-14 store three coefficients that correspond to one of eight possible equations (FIG. 11). A slope, a Y intercept, and a minimum percentage assist for each of the eight is required. Memory locations 12-14 store these constants for the situation when dashboard switches S1, S2, and S3 are open. The remaining seven combinations are stored. sequentially in EEROM address locations 15-35. They have been omitted from the Table 1 illustration since they contain the same information but for different switch settings. Each microprocessor monitors these switch settings once every foreground pass to determine whether a change in power steering assist has been requested. If a change has occurred different constants will be utilized in performing the speed vs. assist calculation noted above. Even if no power steering assist has been requested, processor A will refresh its RAM with the constants related to the switch settings every four minutes.

Once an appropriate energization duty cycle has been calculated this information is transmitted to the pulse width modulation circuit 72 via the multiplex bus 60. This step is performed by both a portion of foreground program and by an interrupt routine which readies output port 3 with an appropriate bit pattern and strobes the data to the latch 310. The transmission of the pulse width modulated signal from the comparator 314 does not affect motor energization unless one or the other of the motor left or motor right inputs to the logic circuit has been energized by the microprocessor 40. If the calculations discussed above indicate no motor assist is required, these outputs are never energized and no pulse width modulation is transmitted to the armature windings. If assist is required, the microprocessor 40 generates an appropriate signal either motor right or motor left and the armature windings are energized with the calculated duty cycle.

The foreground portion of the operating system allows each microprocessor to monitor the performance of the power circuit. Each microprocessor determines whether the motor is applying energization in an appropriate sense (either to the right or to the left), each microprocessor monitors the current passing through both the field and armature coils and determine whether an appropriate response has been produced by the motor, each microprocessor senses any over current condition, each microprocessor monitors the voltage values generated by the voltage regulators 154, 156, each microprocessor monitors the temperature of the sensor 196 (FIG. 3), and each microprocessor monitors the voltage level at the battery.

In the event either microprocessor senses an error on any of these sensed inputs, it can shut down the assist with different degrees of urgency or can reduce the amount by a specified percentage. Also, certain errors are recoverable and others are non-recoverable. To illustrate these distinctions Table 2 below illustrates the bit definitions of ERRCNT and ERRCNT +3.

TABLE 2

| ERRCNT |
| --- |
| (Immediate Reduction To Zero) |
| (Not Recoverable) |
| bit |
| 0 Torq Diff > 5% or Torq > 6 Degrees |
| 1 — |
| 2 Sense Right & Left |
| 3 — |
| 4 Over current |
| 5 — |
| 6 7% Drift of System Voltage (+5) |
| 7 — |
| ERRCNT +3 |
| (0-5 Soft Ramp to Partial) |
| (Recoverable) |
| (6-7 Soft Ramp to Zero) |
| (Recoverable) |
| bit |
| 0 Temp Sensor (>200° C. or < −75° C. |
| 1 - (out of range test for faulty sensor) |
| 2 Temp >175° C. |
| 3 — |
| 4 Temp >150° C. |
| 5 — |
| 6 10 V <Battery <16 V |
| 7 — |

Memory location ERRCNT is seen to be used for storing a summary of action to be taken. Memory location ERRCNT +3, however, is a memory location reserved for storing details offerrors. Thus, for example, when either microprocessor senses an over current condition (indicating a short circuit in the motor), the foreground portion of the algorithm immediately removes power assist via a control output to the AND gate 84. This de-energizes the coil 88 and removes all power from the armature and field windings. Subsequent to this de-energization a reset is generated by the microprocessor that initiated the shut down. Other reasons for immediately terminating motor assist are a discrepency of more than 5% between the two torque inputs, torque 1 and torque 2 from their zero values, a failure to sense a right or left motor energization in response to control outputs from the microprocessor 40, or a deviation greater than 7% in the system voltage of 5 volts. These occurrences are all stored in memory location 96 (ERRCNT) by a subroutine (Appendix B) labeled EEROMW.

Less severe errors are treated by removing or reducing the assist and determining if these errors can be overcome. In memory location ERRCNT +3 (bits 0-5) are stored indications of when the temperature has exceeded certain limits. This condition may be temporary and therefore recoverable. The microprocessor causes the motor assist to ramp down to a partial value and continued testing may indicate the assist should be ramped back up to full assist. Therefore the indication "soft ramp to partial" in Table 2 indicates a relatively slow removal of the power assist to a specified percent of normal with the possibility of returning to normal after a passage of time. Also, if the battery voltage (bit 6 and 7) is seen to be outside a specified value, the assist can be ramped completely to zero, with a possibility of recovery from this condition.

Whether a condition is recoverable or non-recoverable, the occurrences of these conditions is stored in the memory unit 62 to aid in diagnosing the performance of the control unit 14.

To avoid any possibility that these errors are inaccurately sensed, the reductions noted in Table 2 to either zero assist or to a partial assist are not implemented unless the condition under test has been sensed three consecutive times as indicated by a counter which is incremented by the foreground portion of the algorithm. In the event, for example, that only one error is sensed and on the next succeeding test, that condition is not sensed, the register is cleared and no assist reduction occurs.

It should be appreciated from the above that when a recoverable error is sensed, the foreground continues to monitor the conditions which cause this recoverable error and in the event the conditions are eliminated, a ramp back up to full assist is provided. An indication that this ramp back to full assist has been performed is stored in memory location ERRCNT +2.

One additional feature of the foreground portion of the algorithm is the writing to the memory unit. It is seen by referring to Table 1 that memory locations (decimal) 102-119 include information regarding performance of the control unit 14. This information is stored upon the occurrence of a fault, either recoverable or non-recoverable, and can be withdrawn from the memory unit and transmitted as serial information to a remote computer for diagnostic purposes. Thus, in addition to keeping track of faults and their occurrences the memory unit stores information regarding the various parameters the microprocessors monitor.

Interrupts

Two hardware generated interrupts have already been discussed. A reset signal generated either at power up, or by the reset circuitry 340 of FIG. 10, or a direct output from pin P42 on either microprocessor 40, 42 causes a reset algorithm to be performed. A non-maskable speed interrupt is also included to increment a counter for monitoring vehicle speed.

Five other hardware interrupts are also supported by interrupt routines. A so-called "input capture" routine controls the inputting of data from the multiplex unit 50, 52. An assembly language listing of this interrupt processing routine is appended as Appendix C to the present disclosure. The performance of this interrupt routine in converting the analog signal from the multiplex units 54, 56 to digital data has already been discussed. The "input capture" routine is accessed from the foreground via a hardware generated interrupt every time an analog input has been converted. It should be recalled that the two torque inputs from the torque sensor 24 are accessed each time through the foreground routine and that one of the remaining seven analog inputs is also accessed each time through that routine.

A second interrupt controls the transmission of the correct duty cycle via the bus 60 to the pulse width modulation circuit 72. This interrupt is generated in response to an internal interrupt from the foreground algorithm.

A third interrupt routine is accessed in response to the overflow of a timing counter internal to the microprocessor. This counter is used in timing events performed by each microprocessor. This counter enables speed to be monitored, the switches to be read, the analog data to be captured and the RAM memory to be refreshed.

A fourth interrupt routine controls serial communications through each microprocessor. These communications allow the contents of the memory locations in the memory unit 62 to be modified or read. The serial communication circuit can also, with the help of the microprocessor, read these constants and use them in diagnosing failure modes of the unit 14. The communications signals can be coupled to either an additional controller inside the vehicle or can be coupled to a diagnostic unit having a mechanism for monitoring serial communications from the control unit 14.

The communications request is specific as to which microprocessor is to communicate. Simultaneous data transmission by both microprocessors never occurs but simultaneous data reception is possible.

A fifth interrupt routine is accessed in response to the READY signal coming from the memory unit 62. This routine is used to signify to both processors 40, 42 that the memory unit 62 is ready to be accessed.

In summary, the foreground algorithm determines how large an assist is needed based upon the vehicle speed and torque applied by the user. In response to these inputs the motor 12 is pulse width modulated to assist turning. As this assist aids the user in maneuvering, the torque will diminish and the assist provided will also diminish until the torque is within the deadband range.

The disclosed power steering control has been described with a degree of particularity. Many of the features discussed can be implemented in a number of ways and it is the intent that all such modifications and/or alterations in the disclosed design falling within the spirit or scope of the appended claims be protected.

| APPENDIX A |
|---|
| *Read EEROM calling module provides BYTE CNT, 1st |
| *EROM BYTE Adrs, 1st BFR Adrs. chks EROM busy flag |
| *'A' returns with chksum |
| EEROMR    LDAA   #$AO |
|                 STAA    PORT4 |
|                 LDAA   #$FO |
|                 STAA    P4DDR |

-continued

| | LDAA | P3CSR | ALE enable on read |
| | ORAA | #$10 | by setting OSS bit |
| | STAA | P3CSR | |
| | TSTB | | |
| LOOPH1 | BEQ | ENDH | if BYTE CNT = 0 |
| | LDAA | #$FF | |
| | SEI | | |
| | STAA | P3DDR | |
| | LDAA | ERMADR | give EROM ADRS |
| | STAA | PORT3 | |
| | CLI | | |
| | INC | ERMADR | update EROM ADRS PTR |
| | CLRA | | |
| | STAA | P3DDR | |
| | LDAA | #$80 | lower OE line |
| | STAA | PORT4 | |
| | LDAA | PORT3 | put data BYTE in EROM RD BFR |
| | STAA | O,X | |
| | LDAA | #$A0 | raise OE line |
| | STAA | PORT4 | |
| | INX | | update PTR to NXT BFR POS |
| | DECB | | |
| | BRA | LOOPH1 | |
| ENDH | CLR | P3DDR | let 'B' have buss |
| | RTS | | |

APPENDIX B

*write EEROM routine
*caller provides # of BYTES to be transferred
*address of 1st BYTE in the EEROM and ADRS
*OF 1st BYTE OF BFR in RAM the caller
*is also responsible for setting EEROM busy flag
*and giving 1st EEROM ready, causing routine to self start

| EEROMW | LDAA | #$10 | |
| | STAA | P4DDR | |
| | LDAA | PORT4 | |
| | ANDA | #$40 | |
| | BEQ | EEROMW+4 | |
| | LDAA | #$A0 | |
| | STAA | PORT4 | |
| | LDAA | #$F0 | |
| | STAA | P4DDR | |
| EROMW1 | LDAA | ROMRDY | |
| | BEQ | WRTDLY | |
| | CLR | ROMRDY | |
| | LDAA | ERMONT | |
| | BNE | SKPG1 | test for completion of transfer |
| | CLR | ROMBSY | |
| | BRA | WRTDLY | exit program EEROM module |
| SKPG1 | SEI | | |
| | CLR | ROMFLG | tell EEROM gonna be programmed |
| | LDAA | #$AF | |
| | STAA | PORT4 | |
| | LDAA | #$FF | |
| | STAA | P3DDR | |
| | LDAB | P3CSR | enable ALE strobe |
| | TST | PORT3 | clear 1S3 flag |
| | ORAB | #$50 | enable 1S3 interrupt |
| | STAB | P3CSR | |
| | LDAA | ERMADR | give EEROM the address |
| | STAA | PORT3 | |
| | INC | ERMADR | INCR EROM ADRS PTR |
| | ANDB | #$EF | disable ALE strobe |
| | STAB | P3CSR | |
| | LDX | EBFPTR | get EROM BFR PTR |
| | LDAA | O,X | |
| | STAA | PORT3 | give EROM data |
| | LDAB | #$2F | lower WE line |
| | STAB | PORT4 | |
| | BSR | WRTDLY | wait for EEROM to recognize the write enable RST WE line, but leave driver switches disabled |
| | LDAB | #$A0 | |
| | STAB | PORT4 | |

-continued

| | CLI | | |
| | INX | | NXT data BYTE |
| | STX | EBFPTR | |
| | DEC | ERMONT | DECR EROM BYTE count |
| ENDG | CLR | P3DDR | |
| WRTDLY | RTS | | |

APPENDIX C

*
*input capture:CALCS A/D conversion time, schedules
NXT A/D and enables conversion
* (approx. 200 microsec per input capture)
*

| INPCAP | LDAA | TCSR | |
| | LDAA | PORT1 | |
| | ORAA | #$80 | |
| | STAA | PORT1 | discharge cap (raise pin 20) |
| | LDX | #PARVAL | get previous value |
| NAD | LDAB | CNTRJ | a number between 2 & 8 |
| | LSLB | | multiply by two |
| | ADX | | |
| | LDD | INCAP | |
| | SUBD | STTIME | |
| | DITA | #$E0 | |
| | BEQ | GOODDA | |
| | LDD | #$1FF | |
| GOODDA | STD | X | store new value |
| SKPJ6 | BSR | SELNAD | |
| | CLR | CAPSTY | |
| | RTI | | |

****SELECT NEXT A/D

| SELNAD | INC | CNTRJ | |
| | LDAA | #$10 | |
| | STAA | PORT2 | lower selector inhibit line |
| | LDAA | CNTRJ | |
| | CMPA | #2 | |
| | BMI | ADNRM | branch if finishing torque 1 |
| | BEQ | T2AD | branch if finishing torque A2 |
| | CLRA | | |
| | STAA | CNTRJ | |
| | BRA | ADNRM | |
| T2AD | INC | PARNUM | |
| | LDAA | PARNUM | prepare to take other A/D |
| | STAA | CNTRJ | |
| NEXTAD | CMPA | #$08 | battery? |
| | BEQ | ADBAT | if so |
| | BLO | ADNRM | A/D of 0-7 inputs |
| | LDAA | #2 | |
| | TAB | | restart A/D sequence at armature current |
| | STD | CNTRJ | |
| ADNRM | LSLA | | |
| | LSLA | | |
| | LSLA | | |
| | LSLA | | |
| | LDAB | #$0F | |
| | ANDB | PORT1 | |
| | ABA | | 'add' accumulators |
| | LDAB | TCSR | |
| | BITB | #$20 | |
| | BEQ | LOAD | |
| | STAB | FLAG | |
| LOAD | STAA | PORT1 | |
| | LDD | TCNT | get timer counter value |
| | STD | STTIME | |
| ENDADS | RTS | | |
| ADBAT | LDD | #$001F | |
| | STAB | PORT2 | |
| | BRA | ADNRM | |

We claim:

1. An analog to digital converter comprising:
a comparator having two inputs, one input coupled to an analog signal having a magnitude to be converted to a digital signal;

voltage means coupled to a second input of said comparator for producing a time varying voltage at said second input to said comparator to cause a comparator output to change output state when said analog signal and the time varying voltage are the same;

said voltage means comprising a positive constant current source having a current source output coupled to said second input of the comparator, a capacitor coupled between the constant current source output and a ground for producing said time varying voltage by storing charge from the constant current source, and a control switch for initiating the time varying voltage by initiating a charging of the capacitor; and a microprocessor controller having a microprocessor output coupled to the control switch to initiate the time varying voltage, a microprocessor input for sensing the output from the comparator to determine when the time varying voltage and the analog signal are equal, and a microprocessor timer for determining how long after the control switch initiates said time varying voltage it takes for the microprocessor input to change state indicating that the time varying voltage and analog signal are equal.

2. The analog to digital converter of claim 1 wherein the control switch comprises a gating transistor having a control input to turn on said gating transistor which, when turned on, provides a discharge path for the capacitor and when subsequently turned off initiates charging of the capacitor to initiate the time varying voltage.

3. The analog to digital converter of claim 1 wherein the microprocessor timer is a free running timer and the microprocessor comprises memory locations for storing a first timer count at initiation of the time varying voltage and a second timer count when the analog signal equals the time varying signal, and further comprises means for subtracting the first and second counts to provide said digital signal.

4. The analog to digital converter of claim 1 wherein the constant current source comprises a charging transistor biased by a positive constant voltage source to maintain a constant emitter-collector current for charging the capacitor.

5. The analog to digital converter of claim 1 wherein the constant current source is a regulated current source.

6. The analog to digital converter of claim 5 wherein the constant current source comprises a charging transistor biased by a constant voltage source, said voltage source receiving an input from said charging transistor, whereby the constant voltage source maintains a constant emitter-collector current for charging the capacitor.

7. The analog to digital converter of claim 1 wherein said constant current source in said voltage means includes a positive constant supply voltage coupled to a noninverting amplifier.

8. The analog to digital converter of claim 2 wherein one plate of said capacitor, a collector of said gating transistor and the output of said constant current source are connected in parallel to the second input of said comparator and also wherein a second plate of said capacitor and an emitter of said gating transistor are grounded.

9. The analog to digital converter of claim 1 wherein a disabling switch is interposed between said comparator output and said microprocessor input whereby the comparator output is decoupled from the microprocessor input and the analog to digital converter does not function while a disabling signal is sent from said microprocessor controller to said disabling switch.

10. An analog to digital converter for deriving a digital signal from an analog signal comprising:

a comparator having two inputs, one input coupled to such analog signal;

voltage means coupled to a second input of said comparator for producing an increasing voltage at said second input to said comparator to cause a comparator output to change output state when the increasing voltage is greater than the analog signal;

said voltage means comprising a charging transistor biased by a positive constant voltage source to maintain a constant emitter-collector current for charging the capacitor, a capacitor coupled to the charging transistor for producing said increasing voltage by storing charge from the constant current source, and a control switch comprising a gating transistor having a control input for initiating the increasing voltage by initiating a charging of the capacitor; and a microprocessor controller having a microprocessor output coupled to the control switch to initiate the increasing voltage, a microprocessor input for sensing the output from the comparator to determine when the increasing voltage is less than the analog signal, a free running microprocessor timer, memory locations for storing a first timer count at initiation of the time varying voltage and a second timer count when the increasing voltage is greater than the analog signal, and an arithmetic element for subtracting the first and second timer counts to provide said digital signal.

11. The analog to digital converter of claim 10 wherein one plate of said capacitor, a collector of said gating transistor and the output of said constant current source are connected in parallel to the second input of said comparator and also wherein a second plate of said capacitor and an emitter of said gating transistor are grounded.

12. Apparatus for converting an analog sensor output to a digital signal comprising:

a comparator having two inputs;

voltage means coupled to one of said inputs for producing a time varying voltage at said one of said inputs;

said voltage means comprising a constant current source, a capacitor coupled to the constant current source for producing said time varying voltage by storing charge from the constant current source and a control switch for initiating the time varying voltage by initiating a charging of the capacitor;

a sensor signal switch for selectively coupling such analog sensor signal to another of the inputs to the comparator;

a base voltage switch for selectively coupling a base voltage to said other of the inputs to the comparator; and a microprocessor controller having:

a first microprocessor output coupled to the control switch to initiate the time varying voltage, a second microprocessor output coupled to one of said sensor signal and base voltage switch for coupling one of the analog sensor signal and base voltage to said other of the inputs to the comparator, a microprocessor input for sensing an output from the comparator to determine when the time varying voltage and the analog signal are the same, a microprocessor timer for measuring an analog sensor signal value related to how long after the control switch initiates said time varying voltage it takes for the microprocessor input to change state indicating that the time varying voltage and the analog signal are the same, and an arithmetic element for comparing the analog sensor signal value and a value related to the base voltage.

* * * * *